United States Patent
Langeman

(10) Patent No.: US 9,662,859 B2
(45) Date of Patent: May 30, 2017

(54) COMPOSITE EDGE TRIMMING TAPE

(71) Applicant: Langeman Manufacturing Limited, Leamington (CA)

(72) Inventor: Gary D. Langeman, Leamington (CA)

(73) Assignee: LANGEMAN MANUFACTURING, Leamington, On (CA)

( * ) Notice: Subject to any disclaimer, the term of this patent is extended or adjusted under 35 U.S.C. 154(b) by 0 days.

(21) Appl. No.: 14/919,142

(22) Filed: Oct. 21, 2015

(65) Prior Publication Data

US 2016/0114561 A1 Apr. 28, 2016

(51) Int. Cl.
| | | |
|---|---|---|
| *B32B 7/06* | (2006.01) | |
| *B32B 37/12* | (2006.01) | |
| *B32B 7/12* | (2006.01) | |
| *B32B 37/02* | (2006.01) | |
| *B32B 37/14* | (2006.01) | |
| *B32B 37/20* | (2006.01) | |
| *B32B 5/02* | (2006.01) | |
| *B32B 5/24* | (2006.01) | |
| *B32B 7/02* | (2006.01) | |
| *B32B 27/06* | (2006.01) | |
| *B32B 27/12* | (2006.01) | |

(Continued)

(52) U.S. Cl.
CPC ................. *B32B 7/06* (2013.01); *B32B 3/08* (2013.01); *B32B 5/02* (2013.01); *B32B 5/24* (2013.01); *B32B 7/02* (2013.01); *B32B 27/06* (2013.01); *B32B 27/12* (2013.01); *B32B 27/32* (2013.01); *B32B 37/02* (2013.01); *B32B 37/12* (2013.01); *B32B 37/144* (2013.01); *B32B 37/203* (2013.01); *B32B 7/12* (2013.01); *B32B 2262/02* (2013.01); *B32B 2262/103* (2013.01); *B32B 2307/71* (2013.01); *B32B 2307/712* (2013.01); *B32B 2307/748* (2013.01); *B32B 2405/00* (2013.01)

(58) Field of Classification Search
CPC .. B32B 7/06; B32B 7/12; B32B 37/12; B32B 37/203; B32B 37/02; B32B 37/144; B32B 2405/00; B32B 2307/748; B05D 1/322; Y10T 428/14
See application file for complete search history.

(56) References Cited

U.S. PATENT DOCUMENTS

| | | |
|---|---|---|
| 2,005,665 A | 6/1935 | Saignier |
| 2,750,316 A | 6/1956 | Bemmels |
| 2,771,385 A | 11/1956 | Humpner |

(Continued)

*Primary Examiner* — Patricia L Nordmeyer
(74) *Attorney, Agent, or Firm* — Kagan Binder, PLLC

(57) ABSTRACT

A roll of composite edge trimming tape made by adhering masking tape to filament-bearing adhesive tape. The filament-bearing adhesive tape is made from a double-coated tape having a substrate layer and two adhesive layers. A filament is placed along the length of the masking tape in contact with one of the adhesive layers at equal distances from the edges of the tape. The tape is then folded so that the portions of the tape on either side of the filament are bonded together by the adhesive layer, and the tape surrounds the filament at one end of the filament-bearing adhesive tape. The composite edge trimming tape is formed by bringing the adhesive side of the masking tape in contact with an adhesive surface of the filament-bearing adhesive tape so one longitudinal edge of the masking tape is proximate to the portion of the filament-bearing adhesive tape containing the filament.

13 Claims, 6 Drawing Sheets

(51) Int. Cl.
*B32B 27/32* (2006.01)
*B32B 3/08* (2006.01)

(56) References Cited

U.S. PATENT DOCUMENTS

| | | | |
|---|---|---|---|
| 2,786,510 | A | 3/1957 | Humpner |
| 3,034,941 | A | 5/1962 | Hessenthaler et al. |
| 3,130,078 | A | 4/1964 | Lewis |
| 3,967,031 | A | 6/1976 | Lambert |
| 4,255,469 | A | 3/1981 | McGinness |
| 4,539,248 | A | 9/1985 | Brockington et al. |
| 5,466,500 | A | 11/1995 | Pluim |
| 6,025,045 | A * | 2/2000 | Langeman .......... B05B 15/0456 428/124 |
| 6,284,319 | B1 | 9/2001 | Langeman |
| 6,875,469 | B2 | 4/2005 | Langeman |
| 7,014,900 | B2 | 3/2006 | Langeman |
| 8,361,615 | B2 | 1/2013 | VanDenBerghe et al. |
| 2006/0266464 | A1 | 11/2006 | White |
| 2012/0231167 | A1 * | 9/2012 | Langeman .......... B05B 15/0456 427/265 |

* cited by examiner

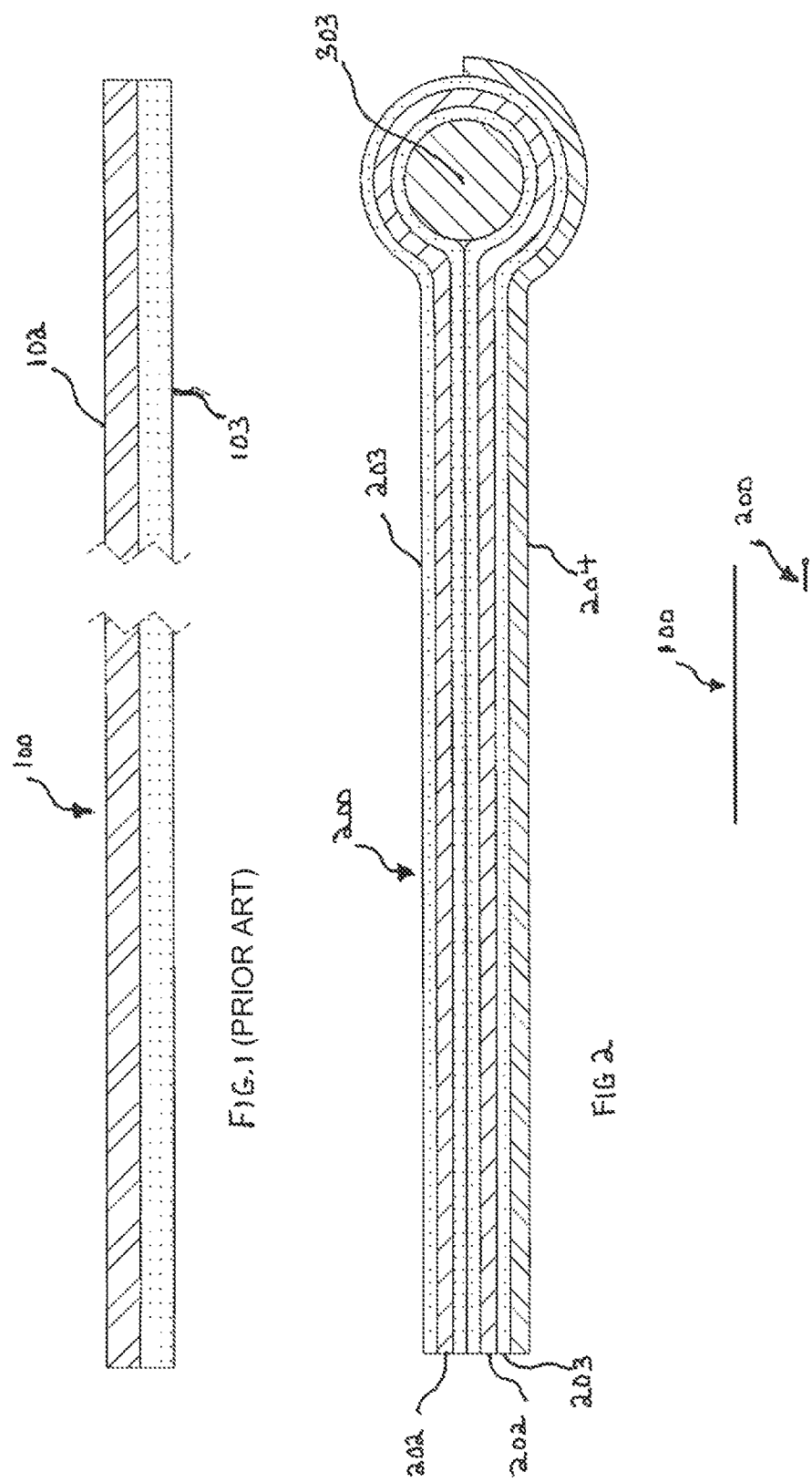

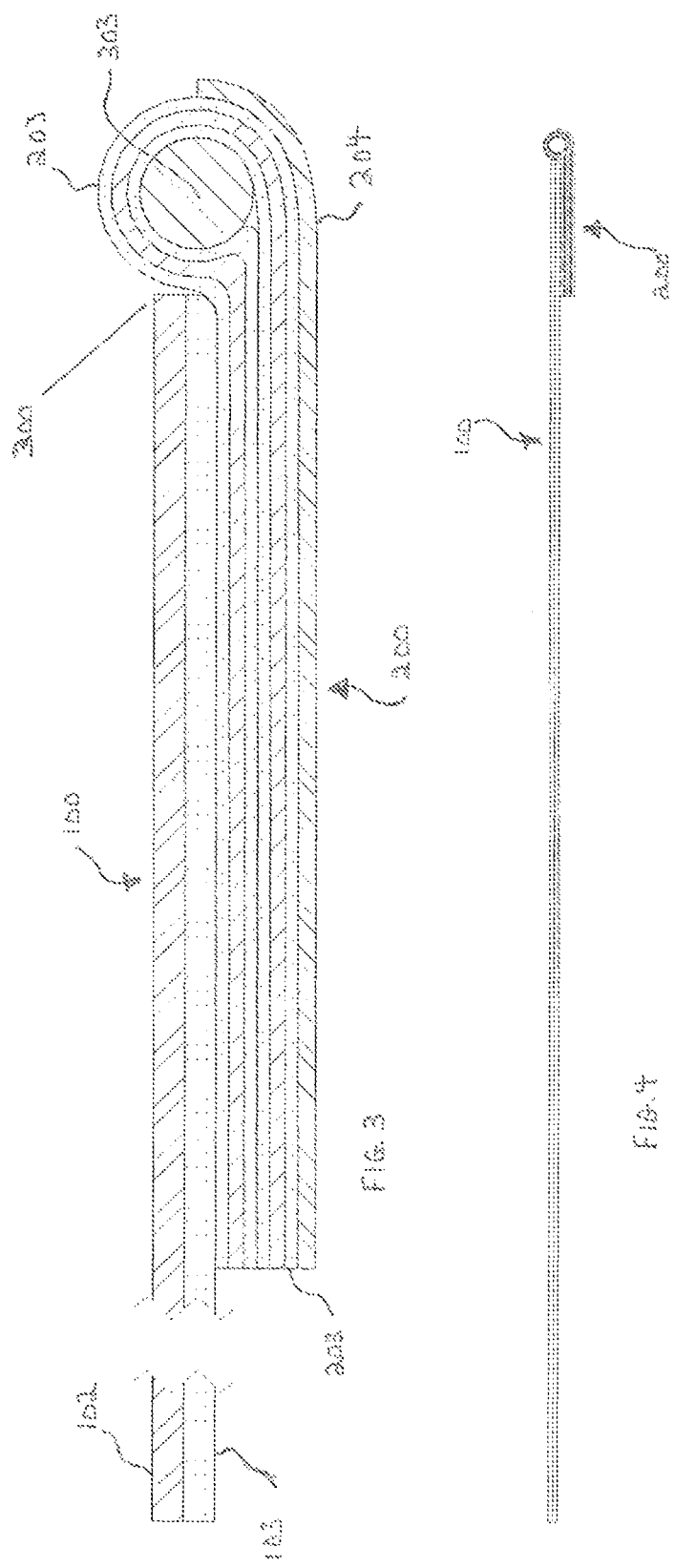

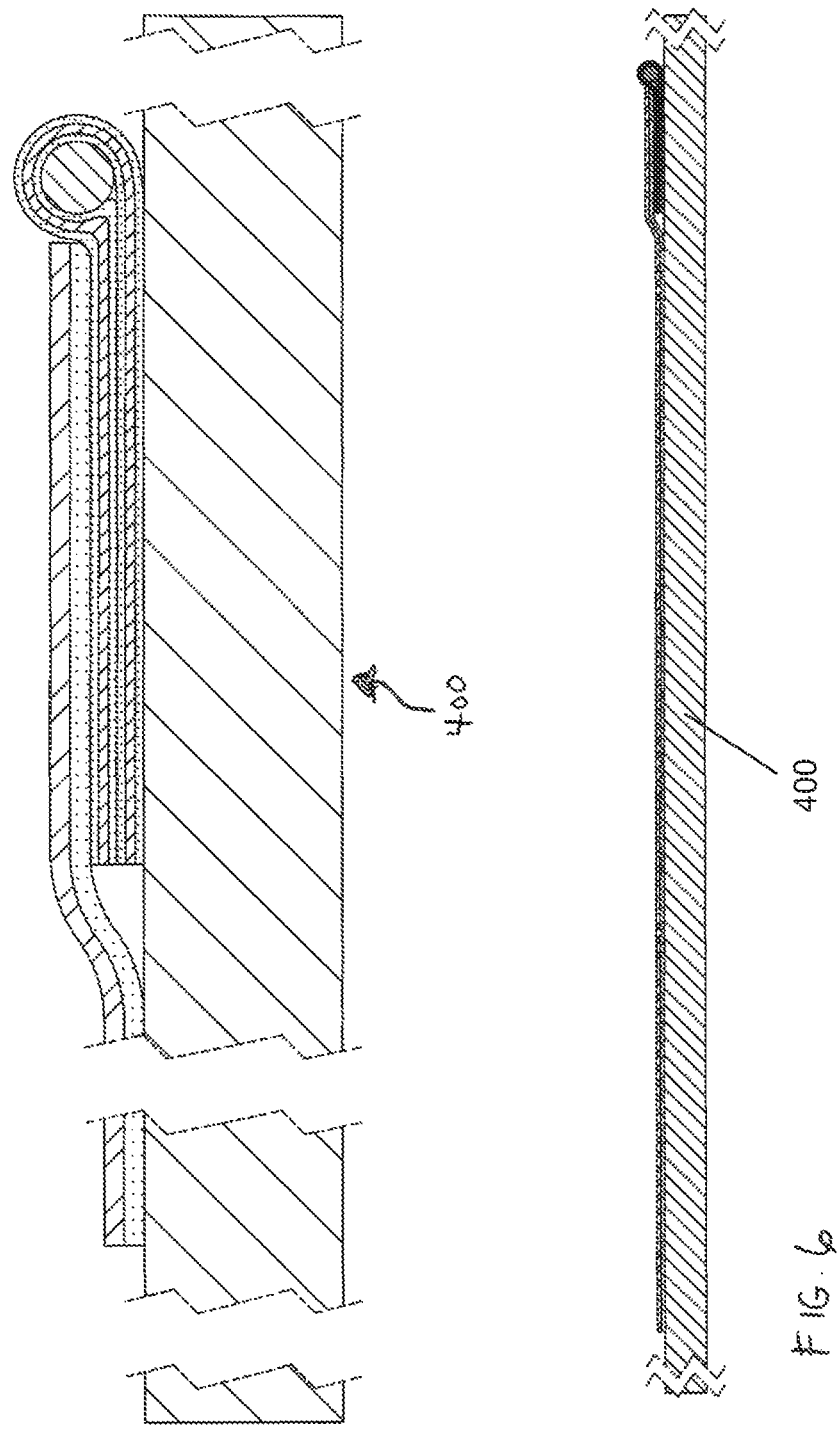

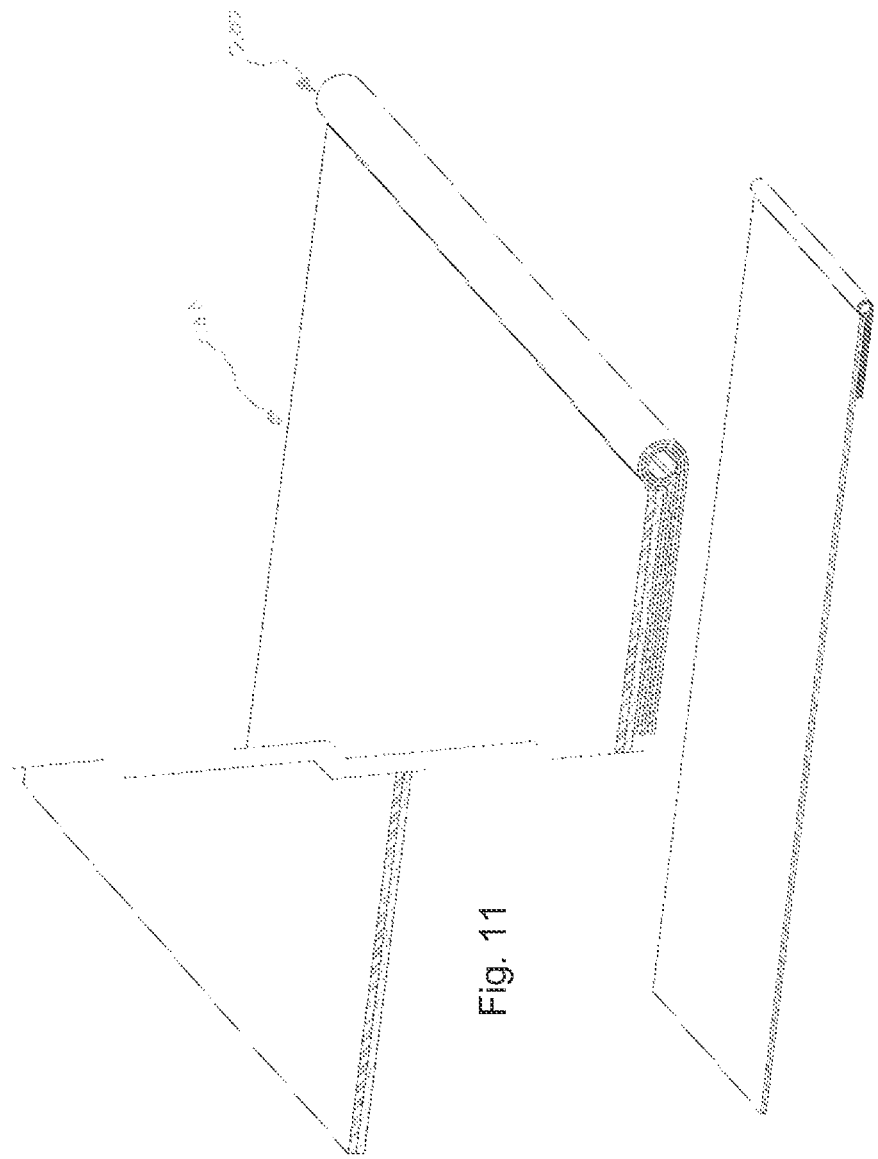

COMPOSITE EDGE TRIMMING TAPE

PRIORITY CLAIM

This application claims priority to Canadian application having Serial Number 2,868,169, filed on Oct. 22, 2014, which is incorporated herein by reference in its entirety.

FIELD OF THE INVENTION

The present invention relates generally to edge trimming tape for trimming coatings, such as paint, on surfaces, and more particularly to edge trimming tape for trimming thick coatings.

BACKGROUND OF THE INVENTION

The protective coatings industry has continued to gain traction with the evolution of thick film polyurea chemistry and the ability to apply them, typically with industrial spray machinery, to almost any type of substrate surface.

We are seeing thicker and thicker coating films/membranes being applied, even as thick as one inch (1") thick. In the case of protecting a large floor area such as a ship deck, before application of the coating, masking must be applied to prevent coating an area that is not to be coated. Afterwards, the masking must be removed but before that can happen, there has to be a viable means by which to trim through the coating to delineate the edge of the coating and the edge of the masking tape, in order to allow for the clean removal of the masking tape.

A similar problem is addressed by the WireTrim™ product manufactured and sold by Langeman Manufacturing Limited, and described in Canadian Patent No. 2170573, issued on Nov. 9, 1999, and U.S. Pat. Nos. 6,025,045, 6,284,319, 6,875,469 and 7,014,900, each of which is hereby incorporated into this document by reference, except that the WireTrim™ product is not designed for trimming very thick coatings, such as one inch ship deck coatings. Wiretrim™ is not sufficient. A much stronger wire or cutting filament is required to cut through a thick coating or thick films such as films one inch thick.

SUMMARY OF THE INVENTION

The invention provides a composite edge trimming tape formed from a filament-bearing adhesive tape and a masking tape. The filament-bearing adhesive tape is formed from an elongate substrate folded onto itself so as to form a folded edge. The folded substrate has a first exterior surface and a second exterior surface opposite the first exterior surface. The first exterior surface has adhesive on at least a portion of the surface. A filament is enveloped and releasably secured within the substrate along the folded edge and between the first and second exterior surfaces. The filament-bearing adhesive tape has a distal edge opposite the folded edge and the width of the filament-bearing adhesive tape is the distance between the filament and the distal edge. The masking tape is formed from an elongate substrate and an adhesive layer. The masking tape has a width greater than the width of the filament-bearing adhesive tape. The masking tape has first and second edges. A portion of the adhesive layer of the masking tape adhesively attaches the substrate of the masking tape to the second exterior surface of the filament-bearing adhesive tape with the first edge of the masking tape being proximate to the filament.

The width of the masking tape is preferably at least twice the width of the filament-bearing adhesive tape, and more preferably at least three times the width of the filament-bearing adhesive tape.

The folded substrate has its two interior surfaces that are preferably bonded together by adhesive.

The masking tape preferably does not overlap the filament.

The filament may have a diameter of at least 0.015 inches, or a diameter of at least 0.02 inches.

The filament may be made from carbon steel.

The composite edge trimming tape may be rolled upon itself multiple times such that each subsequent roll has a circumference larger than the previous roll so as to form a spool of composite edge trimming tape. The adhesive layer of the masking tape and the first exterior surface of the filament-bearing adhesive tape of a first roll portion of the spool of composite edge trimming tape may then contact the substrate of the masking tape of a second roll portion of the spool of composite edge trimming tape.

The filament-bearing adhesive tape may also have a non-adhesive release liner removably secured to the first exterior surface of the folded substrate. In that case, the composite edge trimming tape may be rolled upon itself multiple times such that each subsequent roll has a circumference larger than the previous roll so as to form a spool of composite edge trimming tape. The adhesive layer of the masking tape and the non-adhesive release liner of the filament-bearing adhesive tape of a first roll portion of the spool of composite edge trimming tape may then contact the substrate of the masking tape of a second roll portion of the spool of composite edge trimming tape.

The invention also provides a composite edge trimming tape formed from a masking tape and a filament-bearing adhesive tape. The masking tape is formed from a substrate having adhesive on one surface of the substrate. The filament-bearing adhesive tape is formed from a double-coated adhesive tape having two edges and a filament. The double-coated adhesive tape is formed from an elongate substrate having two surfaces with adhesive on both surfaces of the substrate. The filament-bearing adhesive tape is then formed by placing the filament along the length of the double-coated adhesive tape in contact with the adhesive on one surface of the double-coated adhesive tape at approximately equal distances from the two edges of the double-coated adhesive tape with the filament running longitudinally along the length of the double-coated adhesive tape. The double-coated adhesive tape is then folded over so that the portions of the double-coated adhesive tape that were on either side of the filament are bonded together by the adhesive. The composite edge trimming tape is then formed by bringing the adhesive-bearing surface of the masking tape in contact with one of the adhesive-bearing surfaces of the filament-bearing adhesive tape so that one edge of the masking tape is proximate to the portion of the filament-bearing adhesive tape containing the filament.

The invention also provides a method of manufacturing a composite edge trimming tape. The method employs a filament-bearing adhesive tape and a masking tape. The filament-bearing adhesive tape is formed from an elongate substrate folded onto itself so as to form a folded edge. The folded substrate has a first exterior surface and a second exterior surface opposite the first exterior surface. The first exterior surface has an adhesive on at least a portion of the surface. The filament-bearing adhesive tape has a filament enveloped and releasably secured within the substrate along the folded edge and between the first and second exterior surfaces. The filament-bearing adhesive tape has a distal edge opposite the folded edge and a width that is the distance between the filament and the distal edge. The masking tape is formed from an elongate substrate with adhesive on one of its surfaces. The masking tape has a width greater than the width of the filament-bearing adhesive tape and has first and second edges. A portion of the substrate of the masking tape (having a width approximately equal to the width of the filament-bearing adhesive tape) is attached to the second exterior surface of the filament-bearing adhesive tape by placing the surface of the masking tape with adhesive on it in contact the second exterior surface of the filament-bearing adhesive tape along the lengths of the masking tape and the filament-bearing adhesive tape with the first edge of the masking tape being proximate to the filament.

The step of providing a filament-bearing adhesive tape may be performed starting with the provision of a double-coated adhesive tape and a filament. The double-coated adhesive tape has two edges. The double-coated adhesive tape is formed from an elongate substrate with two surfaces, with adhesive on both surfaces of the substrate. The filament is placed along the length of the double-coated adhesive tape in contact with the adhesive on one surface of the double-coated adhesive tape at approximately equal distances from the two edges of the (unfolded) double-coated adhesive tape with the filament running longitudinally along the length of the double-coated adhesive tape. The double-coated adhesive tape is then folded over so that the portions of the unfolded double-coated adhesive tape that were on either side of the filament are bonded together by the adhesive. Then, the adhesive-bearing surface of the masking tape is brought into contact with one of the adhesive-bearing surfaces of the filament-bearing adhesive tape along the lengths of the masking tape and the filament-bearing adhesive tape so that one edge of the masking tape is proximate to the portion of the filament-bearing adhesive tape containing the filament. Each step of the method does not necessarily need to be completed before the next step is performed. Rather, they may be overlapping in time.

The method may also include a step of rolling the composite edge trimming tape upon itself multiple times such that each subsequent roll has a circumference larger than the previous roll so as to form a spool of composite edge trimming tape. The adhesive-bearing surface of the masking tape and the first exterior surface of the filament-bearing adhesive tape of a first roll portion of the spool of composite edge trimming tape contact the substrate of the masking tape of a second roll portion of the spool of composite edge trimming tape.

BRIEF DESCRIPTION OF THE DRAWINGS

FIG. 1 is a cross-sectional side view of a strip of masking tape across the of the masking tape.

FIG. 2 is a cross-sectional side view a strip of wiretrim tape across the width of the wiretrim tape.

FIG. 3 is a cross-sectional side view of a strip of an embodiment of the new composite edge trimming tape across the width of the composite edge trimming tape.

FIG. 4 is a cross-sectional side view of a strip of an embodiment of the new composite edge trimming tape showing the full width of the tape.

FIG. 5 is a cross-sectional side view of a strip of an embodiment of the new composite edge trimming tape across the width of the composite edge trimming tape with the tape adhered to a surface.

FIG. 6 is a cross-sectional side view of a strip of an embodiment of the new composite edge trimming tape across the width of the composite edge trimming tape showing the full width of the tape adhered to a surface.

FIG. 11 is a cross-sectional perspective view of an embodiment of the new composite edge trimming tape across the width of the composite edge trimming tape.

FIG. 12 is a cross-sectional perspective view of an embodiment of the new composite edge trimming tape showing the full width of the tape.

DETAILED DESCRIPTION OF THE INVENTION

Figure 7:
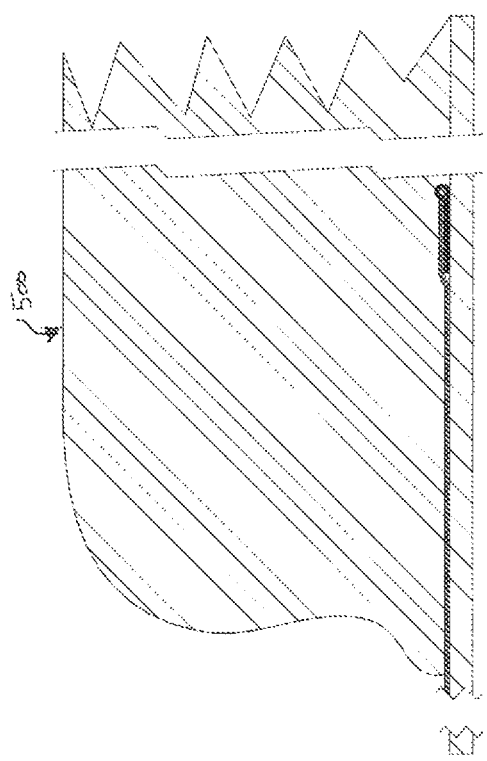
FIG. 7 is a cross-sectional side view of a strip of an embodiment of the new composite edge trimming tape showing the tape adhered to a surface with a coating having been applied to the surface over the composite edge trimming tape.

The present invention is a new composite edge trimming tape that is well suited for trimming very thick coatings applied to surfaces.

For the purposes of trimming very thick coatings, a filament-bearing adhesive tape being a modified form of wiretrim tape can be formed using a high tensile carbon steel wire approximately 0.022" in diameter as the filament. This large diameter filament can be enveloped or enclosed using the existing method of manufacturing conventional wiretrim tape; however, the narrow width of the final construction of conventional wiretrim tape does not offer sufficient adhesive strength to hold the filament to the surface to be coated, so such a modified version of wiretrim tape, by itself, is of little practical value. A wider adhesive tape is necessary. To make a modified version of wiretrim tape using a wider tape, sufficiently wide to support the use, for example of a 0.022" filament, would be cost prohibitive, and the adhesive used to make wiretrim tape is not well suited tier many substrates, such as steel and concrete. The preferred masking tape for such substrates already exists and is cost effective, and the present invention combines the two materials into a single product, which may be rewound onto a roll, so that the special cutting filament can be applied to the surfaces using a timely and effective application process.

Filaments with other diameters can of course alternately be used, such as 0.01", 0.015", 0.02", 0.025", 0.03", 0.04" or greater depending on the requirements of the application (which depends on coating strength and thickness). Generally larger diameter filaments (e.g. 0.02" or greater) are preferred for this composite edge trimming tape. Filaments other than carbon steel may alternately be used provided they have sufficiently high tensile strength for cutting the coatings they need to cut through.

In the construction of Langeman's FiberLine™ product, a small diameter (e.g. 0.01" or less, or 0.005" or less) cutting filament is attached to the adhesive side of a masking tape product that has an adhesive coating on one side of the tape. To do this, the filament must be positioned slightly inwards and away from the edge of the tape to allow the adhesive to hold on to the filament. With a large diameter filament (e.g. 0.02" or greater), this method of attachment is not effective because the adhesive does not have the ability to hold a large and less flexible filament. Another problem with having the cutting filament inboard from the edge of the adhesive masking tape is that the filament can be pulled upwards and through both the masking tape and the coating, leaving a small strip of tape under the edge of the coating and creating the potential for the coating to come loose at the edge and not adhere properly to the substrate as intended.

In the new composite edge trimming tape, filament-bearing adhesive tape is adhered to the adhesive side of the preferred masking tape in a two stage process. This allows for the cutting filament to be positioned outside of the edge of the masking tape so that when the wire is pulled through the coating, 100% of the masking tape is free and away from beneath the coating edge and the bond of the coating to the surface is intact at the extreme edge of the coating.

This also provides for the option of making the filament-bearing adhesive tape with a very aggressive high strength adhesive which will adhere well to a wider masking tape, while the wider masking tape itself can have a less aggressive bond to the surface, or in other words, an adhesive with less strength for the purpose of clean removal. Such aggressive high strength adhesives and less aggressive adhesives are well known to skilled persons.

A high quality exterior grade masking tape that has been approved for use on exterior window frames where stucco is applied to outdoor surfaces surrounding the windows is preferred. Such products are available commercially. Such masking tape may have a cloth reinforced carrier like that of duct tape; however, the adhesive side may utilize a rubber-based adhesive that can be removed cleanly up to 30 days after application while having excellent adhesion while enduring temperature and weather extremes. This same masking tape is ideal and cost effective as an extension of the filament-bearing adhesive tape that contains the filament.

The masking tape may be an 11.8 mils cloth tape consisting of Polyethylene (PE) laminated synthetic fiber cloth and is coated with a rubber-based adhesive. Due to its excellent durability, UV resistance, weather resistance, and water resistance properties, the adhesive leaves practically no residue even under summer heat or winter cold.

Using this type of wide masking tape, anywhere from ¼" wide to 2" wide (although narrower tape, or tape wider than 2" tape could alternately be used), for example, provides the advantage of being able to use practically any double-coated tape to make the enveloped filament-bearing adhesive construction because there is nominal exposure to the elements. Materials to make such double-coated tape are well known to skilled persons, and many suitable products are commercially available.

While a release liner is not required for this product, it is advantageous to employ a release liner on the lower surface of the filament-bearing adhesive tape (away from the masking tape). The liner is attached to the filament-bearing adhesive tape for the manufacturing process but it also provides an advantage in the application process of positioning and repositioning the final product to the surface. It is typical for adhesive masking tape to lose some of its holding strength when it is adhered to a surface and then lifted off and repositioned. There can be contaminants like dust or other particulate or moisture that causes such a loss of holding strength. Securing the edge of the tape in this particular construction, utilizing a heavy gauge metal wire filament poses a significant priority on maintaining the full strength of the adhesive tape to hold the edge of the tape in place, tight to the surface.

The liner facilitates storing the double-sided adhesive tape on a roll, and it is also useful in the manufacturing process of attaching the filament-bearing adhesive tape to the wider masking tape. In the manufacturing process, a pressure wheel is positioned against the release liner side of the filament-bearing adhesive tape and another pressure wheel is positioned against the back, non-adhesive side of the wider masking tape in order to exert a force necessary to ensure an adequate bond of the separate exposed adhesive surfaces. The release liner of the new composite edge trimming tape remains in place as it is rewound onto a roll for storage.

During application of the composite edge trimming tape, the liner serves as protection against contamination of a critical portion of the tape adhesive. Oftentimes the tape must be lifted from the surface after initial application to the surface and repositioned. In such a process, the adhesive can be compromised; however, by having a release liner on the critical portion of the adhesive that must hold the wire firmly to the surface, the release liner may be left intact until the masking tape is in its final position, after which the liner can be pulled away from beneath the tape edge and the tape edge can then be pressed down and secured to the surface.

A preferred embodiment of the composite edge trimming tape is shown in FIGS. 3, 4, 11 and 12 in isolation, the tape is shown in FIGS. 5-10 in use, having been adhered to a surface 400, and the tape is shown in FIGS. 7-10 in use with a coating 500 having been applied to the surface 400.

The composite edge trimming tape is made by adhering a masking tape 100 shown in FIG. 1 to filament-bearing adhesive tape 200 shown in FIG. 2 to form the composite edge trimming tape shown in FIGS. 3 and 4. The masking tape 100 is preferably a high quality exterior masking tape. The masking tape 100 has a substrate layer 102 and an adhesive layer 103. The substrate layer 102 may be made, for example, from a plastic material or any other suitable material. A cloth tape consisting of PE laminated synthetic fiber cloth is a preferred material. The adhesive layer 103 may be made from rubber or synthetic rubber or any other suitable material.

The filament-bearing adhesive tape 200, shown in isolation in FIG. 2, is made from a double-coated tape that has a substrate layer 202 and two adhesive layers 203, one being on either side of the substrate layer 202. The large diameter filament 303 employed in the filament-bearing adhesive tape is thicker than could be usefully employed in conventional wiretrim tape of comparable width.

In one method of making such filament-bearing adhesive tape, a filament 303 is placed along the length of the double-coated tape (being a tape with adhesive layers on both sides of a substrate) in contact with one of the adhesive layers (after having removed any lining that may have been covering the adhesive layer, but preferably retaining the release liner on the other adhesive layer), at the middle of the double-coated tape at approximately equal distances from the two edges of the double-coated tape running longitudinally along the length of the double-coated tape. The double-coated tape is then folded over as shown in FIG. 2 so that the portions of the tape on either side of the filament 303 are bonded together by the adhesive layer (which is now in the middle of the folded tape binding the now interior surfaces of the folded tape together), and the double-coated tape surrounds the filament 303 at one edge of the filament-bearing adhesive tape 200.

Normally a release liner is attached to the outer adhesive surface of the double-coated tape, which then forms the upper and lower surfaces of the folded tape. After the double-coated tape has been folded around the filament 303, the release liner on one surface of the folded tape is then removed to complete the preparation of the filament-bearing adhesive tape 200, leaving a release liner 204 on one side of the filament-bearing adhesive tape 200 as shown in FIGS. 2 and 3.

The composite edge trimming tape is formed by bringing the adhesive side 103 of the conventional masking tape 100 in contact with the exposed adhesive surface (the upper surface in FIG. 3) of the filament-bearing adhesive tape 200 so that one longitudinal edge 300 of the masking tape 100 is proximate (at the point marked 300) to the portion of the filament-bearing adhesive tape 200 containing the filament 303. The longitudinal edge 300 is preferably as close as practical to the filament 303, but without overlapping the filament. However, in some embodiments the longitudinal edge 300 may be spaced apart from the filament. Because the filament 303 is relatively thick, as in FIG. 4, the portion of the filament-bearing adhesive tape 200 containing the filament 303 in the composite edge trimming tape may rise above the upper surface of the masking tape 100 when the masking tape 100 is pressed onto the filament-bearing adhesive tape 200. The masking tape 100 is positioned as in FIGS. 3 and 4 so that the filament 303 is clear of the proximate adjacent edge 300 of the masking tape so that the filament 303 may be removed without disturbing the masking tape 100 at all.

The masking tape 100 and filament-bearing adhesive tape 200 in the composite edge trimming tape are aligned longitudinally along their length (being the direction perpendicular to the page in FIGS. 3 and 4. The width of the masking tape 100 is always greater than the width of filament-bearing adhesive tape 200 from the inner side of the portion of the filament-bearing adhesive tape 200 containing the filament 303 (i.e. at the point marked as 300 in FIG. 3) to the opposite edge of the filament-bearing adhesive tape 200. The width of the masking tape 100 is preferably substantially greater than the width of filament-bearing adhesive tape 200. For example, in FIG. 4, the width of the masking tape 100 is roughly nine times greater than the width of filament-bearing adhesive tape 200. This allows the filament-bearing adhesive tape 200 to be relatively narrow, while the composite edge trimming tape can be made as wide as desired by selecting a masking tape 100 with the desired width.

The width of the masking tape 100 may be selected, for example, to be a multiple of the width of the filament-bearing adhesive tape 200 that is, for example, 1.5, 2, 4, 8, 12, 16 or greater, although any multiple exceeding 1.0 may be appropriate. The width of the filament-bearing adhesive tape may be, for example, in the range of 0.2" to 1.0". Typical embodiments of the composite edge trimming tape based on a 0.4" wide filament-bearing adhesive tape, for example, may employ masking tape having a width of, for example, 1.0", 2.0", 3.0" or 4.0".

The composite edge trimming tape is used to delineate an edge of a portion of the surface that is being coated. For example, it may be used when a ship deck is being coated with a one inch thick coating, or when a truck bed is being coated with a spray-on plastic coating. In FIGS. 5 and 6, the composite edge trimming tape has been adhered to a surface 400 that is to be coated. The composite edge trimming tape may optionally be applied to the surface without first removing the release liner 204. This can be very beneficial in order to allow the applicator to adjust the position of the tape without the filament-bearing adhesive portion of the tape being adhered to the surface, thus avoiding the potential loss of bonding strength that can result from removing and reapplying the filament-bearing adhesive tape after it is adhered to the surface. After the tape is in position, and the adhesive layer 103 of the masking tape portion is bonded to the surface, then the release liner 204 on the filament-bearing adhesive portion 200 can be removed and the filament-bearing adhesive portion 200 can then be bonded to the surface as shown in FIG. 6 with maximum adhesive strength.

Figure 8:
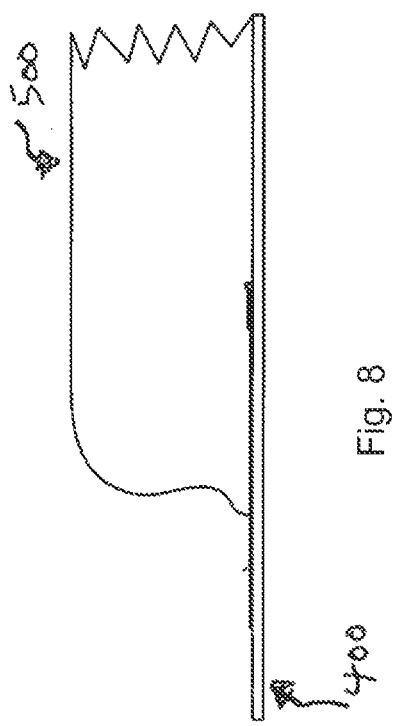
FIG. 8 is a cross-sectional side view of a strip of an embodiment of the new composite edge trimming tape showing the fill width of the tape adhered to a surface with a coating having been applied to the surface over the composite edge trimming tape.
Figure 9:
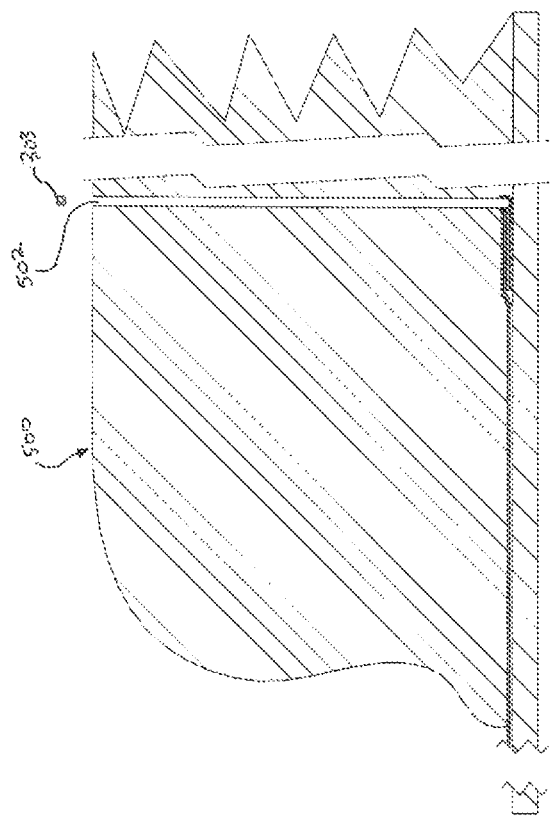
FIG. 9 is a cross-sectional side view of a strip of an embodiment of the new composite edge trimming tape across the width of the composite edge trimming tape showing the tape adhered to a surface with a coating having been applied to the surface over the composite edge trimming tape, after the filament in the composite edge trimming tape has cut through the coating.
Figure 10:
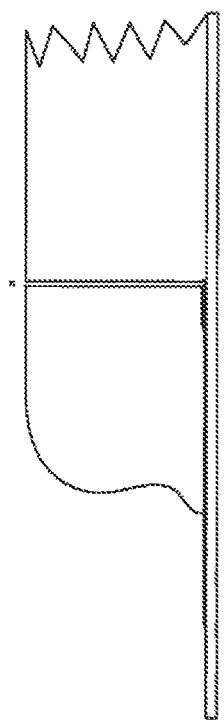
FIG. 10 is a cross-sectional side view of a strip of an embodiment of the new composite edge trimming tape showing the full width of the tape adhered to a surface with a coating having been applied to the surface over the composite edge trimming tape after the filament in the composite edge trimming tape has cut through the coating.

Then in FIGS. 7 and 8, the coating 500 has been applied to the surface 400 and over the portion of the composite edge trimming tape containing the filament. After the coating cures or dries or partially cures or dries, for coatings which require curing or drying, the filament 303 can be pulled through the coating 500, thereby cutting the coating 500, as shown in FIGS. 9 and 10, defining a straight edge 502, such that the remainder of the composite edge trimming tape is under the portion of the coating that is to be removed and discarded with the remaining portion of the composite edge trimming tape.

Composite edge trimming tape can be used for many applications. For example, with a high strength filament, it can be used to cut through concrete in its "green", slightly cured state. Embodiments of the tape can also be used for cutting through "pour in place" products such as playground surfaces made of recycled rubber, heavy plastic films, thick epoxy coatings, thick spray-on foam insulation, etc.

A key advantage of the novel composite edge trimming tape is that one person is able to do the job of applying the tape, coating the surface and trimming the coating precisely, as opposed to requiring two or three people to hold everything in place without ever achieving as precise positioning of the cutting filament and masking tape.

The person applying the composite edge trimming tape can optionally further attach additional masking material to the back of the composite edge trimming tape to provide additional protective coverage beyond the edge of the masking tape. The additional masking material would typically be masking paper or plastic sheet material.

Additional masking material may also be held in place by the composite edge trimming tape, without the need for additional adhesive tape. The paper or film could be secured in place with the composite edge trimming tape with part of the additional material being under the edge of the composite edge trimming tape away from the filament.

The invention also provides methods for modifying filament-bearing adhesive tape, being the tape 200 with a large diameter filament 303 shown in FIG. 2 with upper and lower adhesive layers 203, the lower adhesive layer preferably having a release liner 204 attached thereto, upper and lower substrate layers 202, the upper substrate layer being below the upper adhesive layer and the lower substrate layer being above the lower adhesive layer, with two adhesive layers sandwiched between the upper and lower substrate layers, and having a tar diameter filament 303 on one longitudinal edge surrounded by a generally circular adhesive layer, which is in turn surrounded by a generally circular substrate layer, which is in turn surrounded by a generally circular outer adhesive layer and a semi-circular portion of the release liner, where the inner adhesive layers bind all the parts together. The filament-bearing adhesive tape 200 is modified by attaching a strip of masking tape 100 having a substrate layer 102 and an adhesive layer 103 by first aligning a longitudinal edge of the masking tape 100 with the upper surface of the filament-bearing adhesive tape 200 at the point 300 where the upper surface is not above the filament 303, with the masking tape 100 positioned on that the width of the masking tape 100 extends past the edge of the filament-bearing adhesive tape 200 away from the filament 303. Then the portion of the masking tape 100 above the filament-bearing adhesive tape 200 is pressed down onto the filament-bearing adhesive tape 200 to form the composite edge trimming tape as depicted in FIGS. 3 and 4. The composite edge trimming tape may then be rewound onto a roll to form a roll of composite edge trimming tape.

The invention also provides methods for manufacturing composite edge trimming tape by combining masking tape 100 and filament-bearing adhesive tape 200. This is done by first aligning a longitudinal edge of the masking tape 100 with the upper surface of the filament-bearing adhesive tape 200 at the point 300 where the upper surface is not above the filament 303, with the masking tape 100 positioned so that the width of the masking tape 100 extends past the edge of the filament-bearing adhesive tape 200 away from the filament 303. Then the portion of the masking tape 100 above the filament-bearing adhesive tape 200 is pressed down onto the filament-bearing adhesive tape 200 to form the composite edge trimming tape as depicted in FIG. 3. The composite edge trimming tape may then be rewound onto a roll to form a roll of composite edge trimming tape.

Of course, rather than masking tape 100 being "pressed down", the portion of the masking tape 100 above the filament-bearing adhesive tape 200 and the portion of the filament-bearing adhesive tape 200 below the masking tape 100 may be pressed together by any suitable means.

The "width" of the filament-bearing adhesive tape, as used herein, means the (lateral) distance between the filament and the distal edge of the tape, being the longitudinal edge furthest from the filament. This generally means the distance from the distal edge and the side of the filament proximate to the masking tape 100 (e.g. at the point 300 in FIG. 3, so that the width of the filament-bearing adhesive tape is approximately equal to the width of the portion of the masking tape 100 that is adhered to the filament-bearing adhesive tape.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description and figures as a whole.

What is claimed is:

1. A roll of composite edge trimming tape, the composite edge trimming tape comprising a filament-bearing adhesive tape adhesively attached to a masking tape, wherein:
    the filament-bearing adhesive tape comprises an elongate substrate folded onto itself so as to form a folded edge, the folded substrate having a first exterior surface and a second exterior surface opposite the first exterior surface, the first exterior surface having adhesive on at least a portion thereof, and a filament enveloped and releasably secured within the substrate along the folded edge and between the first and second exterior surfaces, the filament-bearing adhesive tape having a distal edge opposite the folded edge and having a width being the distance between the filament and the distal edge;
    the masking tape comprises an elongate substrate and an adhesive layer, the masking tape having a width greater than the width of the filament-bearing adhesive tape and having first and second edges, a portion of the adhesive layer of the masking tape adhesively attaching the substrate of the masking tape to the second exterior surface of the filament-bearing adhesive tape with the first edge of the masking tape being proximate to the filament; and
    the composite edge trimming tape is rolled upon itself a plurality of times to form the roll of composite edge trimming tape.

2. The roll of composite edge trimming tape of claim 1, wherein the width of the masking tape is at least twice the width of the filament-bearing adhesive tape.

3. The roll of composite edge trimming tape of claim 2, wherein the width of the masking tape is at least three times the width of the filament-bearing adhesive tape.

4. The roll of composite edge trimming tape of claim 1, wherein the folded substrate has two interior surfaces that are bonded together by adhesive.

5. The roll of composite edge trimming tape of claim 1, wherein the masking tape does not overlap the filament.

6. The roll of composite edge trimming tape of claim 1, wherein the filament has a diameter of at least 0.015 inches.

7. The roll of composite edge trimming tape of claim 6, wherein the filament has a diameter of at least 0.025 inches.

8. The roll of composite edge trimming tape of claim 1, wherein the filament comprises carbon steel.

9. The roll of composite edge trimming tape of claim 1, wherein the roll is formed by rolling the composite edge trimming tape upon itself a plurality of times such that each subsequent partial roll has a circumference larger than the previous partial roll so as to form a roll of composite edge trimming tape, wherein the adhesive layer of the masking tape and the first exterior surface of the filament-bearing adhesive tape of a first portion of the roll of composite edge trimming tape are adjacent to the substrate of the masking tape of a second portion of the roll of composite edge trimming tape.

10. The roll of composite edge trimming tape of claim 1, wherein the filament-bearing adhesive tape further comprises a non-adhesive release liner removably secured to the first exterior surface of the folded substrate.

11. The roll of composite edge trimming tape of claim 10, wherein the composite edge trimming tape is rolled upon itself a plurality of times such that each subsequent partial roll has a circumference larger than the previous partial roll so as to form a roll of composite edge trimming tape, wherein the adhesive layer of the masking tape and the non-adhesive release liner of the filament-bearing adhesive tape of a first portion of the roll of composite edge trimming tape contact the substrate of the masking tape of a second portion of the roll of composite edge trimming tape.

12. A roll of composite edge trimming tape, the composite edge trimming tape being formed from a masking tape and a filament-bearing adhesive tape, the masking tape comprising a substrate having adhesive on one surface of the substrate, the filament-bearing adhesive tape being formed from a double-coated adhesive tape having two edges and a filament, the double-coated adhesive tape comprising an elongate substrate having two surfaces with adhesive being disposed on both surfaces of the substrate, by placing the filament along the length of the double-coated adhesive tape in contact with the adhesive on one surface of the double-coated adhesive tape at approximately equal distances from the two edges of the double-coated adhesive tape with the filament running longitudinally along the length of the double-coated adhesive tape, the double-coated adhesive tape then being folded over so that the portions of the double-coated adhesive tape that were on either side of the filament are bonded together by the adhesive, the composite edge trimming tape then being formed by bringing the adhesive-bearing surface of the masking tape in contact with one of the adhesive-bearing surfaces of the filament-bearing adhesive tape so that one edge of the masking tape is proximate to the portion of the filament-bearing adhesive tape containing the filament.

13. The roll of composite edge trimming tape of claim 12, wherein the filament-bearing adhesive tape further comprises a non-adhesive release liner removably secured to the first exterior surface.

* * * * *